Phosphor Comprises Zinc Sulphide Activated with Manganese and Copper

Inventor:
Gorton R. Fonda,
by Harry E. Dunham
His Attorney.

Patented Apr. 18, 1950

2,504,674

UNITED STATES PATENT OFFICE 2,504,674

LUMINESCENT MATERIAL

Gorton R. Fonda, Schenectady, N. Y., assignor to General Electric Company, a corporation of New York Application August 31, 1945, Serial No. 613,767

6 Claims. (Cl. 250—164)

The present invention comprises phosphors of the sulphide type which are characterized by unique properties, and, more specifically, comprises phosphors which are activated jointly by manganese and copper.

Figure 1:
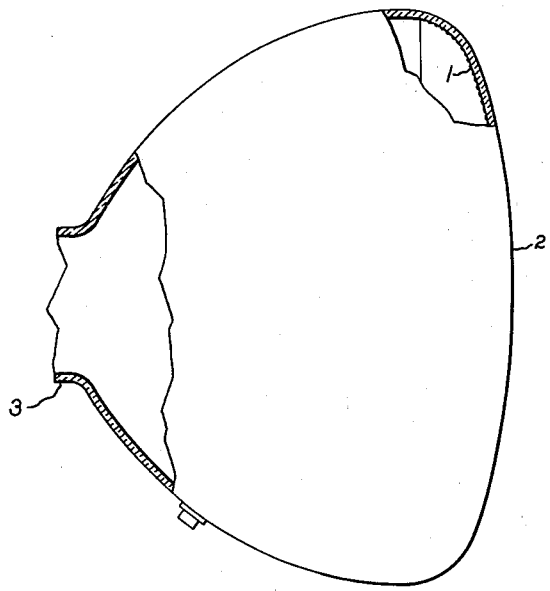

Although the novel phosphors provided by my invention are not restricted in their useful application to any particular field, I have illustrated by the accompanying drawing their embodiment in a cathode ray screen. Fig. 1 shows conventionally in section, and in part broken away, a cathode ray tube containing a luminescent screen; and Fig. 2 conventionally indicates in magnified cross-section a segment of a screen embodying my invention.

My present invention is applicable in one of its embodiments to screens for use in electric discharge devices, such as cathode ray tubes, in which means is provided for bombarding said screens with high speed electrons, which are known also as cathode rays. A cathode ray tube screen indicated by the reference numeral 1 in Fig. 1, when made in accordance with the invention described in the present application, consists of two layers of individual phosphors applied upon the end wall or window 2 of the cathode ray tube 3. One of said phosphors of the screen 1 is adapted when excited by cathode rays to generate ultraviolet radiations (and also visible light adjacent the short wave end of the spectrum) when subjected to electron impingement (from a source not shown). The other phosphor is adapted when excited by photoluminescence from the first-mentioned phosphor to produce visible luminescence of longer persistence than would be obtainable by direct electronic excitation.

Cathode ray screens, briefly known as duplex screens, such as described in my prior application Serial No. 514,815, filed December 18, 1943, published as Patent No. 2,435,436 on February 3, 1948, may comprise a first or inner phosphor consisting of silver-activated zinc sulphide phosphor which emits ultraviolet when activated by cathode rays, and a second or outer phosphor of copper-activated zinc-cadmium sulphide phosphor, or, alternatively, copper-activated zinc sulphide phosphor. The second phosphor emits visible radiations of relatively long persistence, such radiations being referred to as phosphorescence.

The "long persistence" phosphor of copper-activated zinc-cadmium sulphide when activated by radiation from the first phosphor is characterized by yellow phosphorescence. "Long persistence" copper-activated zinc sulphide phosphor is characterized by green phosphorescence. The presence of cadmium in the phosphor as described in my prior application results in a marked shortening of the persistence of phosphorescence as well as in a change of color from green to yellow. The shift in the color of the phosphorescence from green to yellow, that is, toward the long wave end of the spectrum, ordinarily is an advantage as the eye is more sensitive to colors near the long wave end of the spectrum.

If manganese is substituted for copper in the zinc sulphide phosphor, the color of the phosphorescence becomes orange but the phosphorescence becomes shortened in persistence. In some cases it is desired that a duplex screen should be provided which is capable of orange phosphorescence and in which the persistence of phosphorescence is relatively longer than that obtainable from the sulphide screens activated with either manganese or copper alone.

I have discovered that zinc sulphide phosphors activated with copper and manganese in combination with one another are characterized when energized by ultraviolet by orange phosphorescence close in color to that resulting from the use of manganese alone. Their initial intensity is less than that emitted by zinc sulphide phosphor activated with copper alone but their rate of decay is less. The result is that the persistence of their phosphorescence is considerably greater than that obtainable from zinc-cadmium phosphors which are activated solely by copper.

Phosphors embodying my invention also are capable of use in signalling instruments in which phosphors are stimulated to emit light by stimulation with near infrared (IR) radiation of wavelength 1.0 to 1.6 mu even after sufficient lapse of time to cause visible phosphorescence to fall to negligible intensity. Their operation and functioning is similar to that described in an application Serial No. 508,959, filed by me on November 4, 1943, published as Patent No. 2,447,322 on August 17, 1948. In such phosphors, which will be termed IR phosphors, the function of retaining energy releasable by near IR is enhanced by a so-called storage agent.

Desirable proportions of such dual activators are about 0.12 to 0.2 per cent of manganese and about 0.0001 to 0.005 per cent of copper. These proportions refer to elemental copper and manganese. In practice, appropriate compounds are used in amounts adapted to result in the desired content of activator in the final product. The chloride or nitrate of copper may be introduced as a dilute solution, the carbonate, nitrate, or chloride of manganese being introduced as solids because of the larger proportions used. About 2 per cent of sodium chloride is added as a flux and the mixture, after intimate grinding, is fired at 1050 degrees C. or above, to convert the zinc sulphide into the hexagonal form.

Figure 2:
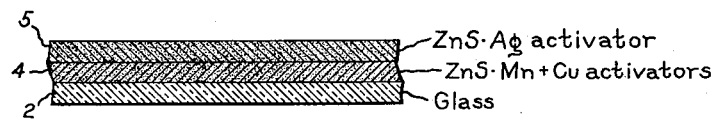

When used in duplex screens such as diagrammatically indicated in Fig. 2, the copper and manganese activated phosphor is employed as the second phosphor 4 located adjacent the glass wall of the window 2 of the cathode ray tube. A suitable overlying phosphor 5 may consist of silver-activated zinc-sulphide. The amount of copper in the phosphor 4 should preferably be in the upper range, approaching 0.005 per cent. For use as near infrared phosphors, described below, the copper is preferably in the lower range. The same range in concentration of manganese may be used for both applications.

The following examples are illustrative:

*Example I*

For duplex screen:
 0.005% Cu as nitrate
 0.20% Mn as carbonate
 2% NaCl
 Fired one hour at 1070° K.

*Example II*

For IR screen:
 0.0001% Cu as nitrate
 0.20% Mn as chloride
 2% NaCl
 Fired one hour at 1070° K.

In improved IR phosphors embodying my invention the manganese functions both as a normal activator and a storage agent, and copper functions solely as a normal activator. The intensity of the stimulated luminescence is much greater in the presence of copper as well as manganese, due presumably to the release of a greater number of excited electrons during the excitation period.

Although I do not wish to be bound by the following explanation, it is my belief that the occurrence of phosphorescence, under radiation by room temperature energy, or of stimulated luminescence, under radiation by near IR, are both due to development of trapped energy within a phosphor. This trapped energy, which is developed in the process of excitation, as by radiation with ultraviolet, is to be ascribed to the formation of "trapping states" or metastable energy levels in the phosphor into which the electrons produced by ultraviolet excitation are liable to fall after they have been raised by the process of excitation from their normal "filled" state to an upper, "unfilled" band. Such electrons are thereby prevented from returning directly to their former state, an occurrence that would give rise to fluorescence. Indeed, they are maintained in these trapped states at the high energy level corresponding to their excited condition until released by the reception of sufficient energy to allow them to escape and reenter the upper, "unfilled" band over the barrier characteristics of the trapping state. It is the height of the barrier which determines the magnitude of the energy and thereby the wave length of the infrared radiation falling upon the phosphor necessary to effect the escape of the electrons. After their escape and after their entry into the upper "unfilled band," they are given an opportunity of returning to their original ground state, accompanied by an emission of their excited energy as luminescence.

In normal phosphors such as zinc sulphide activated with copper alone this assumed barrier is relatively low. The energy of thermal agitation characteristic of room temperature conditions corresponds to IR radiation of about 10 mu and is capable of releasing the excited electrons held in these low barrier traps. It thereby gives rise to phosphorescence. The fact that so little additional luminescence is released by radiation of higher energy content, such as corresponds to the near IR, is evidence that there are present in normal phosphors very few trapping states having higher energy barriers. It may be assumed, therefore, that a near IR storage agent, such as manganese, introduces additional trapping states, the energy barriers of which are so high that the excited electrons lodged within them cannot escape under the thermal conditions of room temperature. They require radiation of greater energy content to bring about their release. The near IR radiation is capable of furnishing the required stimulus which thus results in luminescence.

In the case of phosphors containing both copper and manganese, the presence of copper serves to introduce metastable states or trapping states whose energy barriers are low and which therefore retain excited electrons so effectively that prolonged phosphorescence results. Manganese introduces so few of these low barrier trapping states that its phosphorescence is extremely short. The trapping states associated with copper persist unhampered when manganese is introduced as well as copper. The ground state of the normally filled level of manganese, however, lies at a higher level than does that of copper. Consequently, whenever excited electrons are released from the "copper" trapping states, they are caught by the manganese ground level before they have opportunity to get through to the lower lying copper level. The number of those that do get through is so small, when the proportions of copper and manganese are properly chosen, that the amount of green "copper" phosphorescence is negligible and the orange "manganese" phosphorescence predominates.

The long persistent orange phosphorescence of such a doubly activated phosphor is to be ascribed to low energy trapping states introduced by copper. Its stimulation by near IR on the contrary is presumably due to introduction by manganese of high energy trapping states. In both cases, more particularly in the former, the intensity of the luminescence whether of phosphorescence or of luminescence stimulated by near IR, is greatly increased by the presence of copper.

What I claim as new and desire to secure by Letters Patent of the United States is:

1. A photoluminescent phosphor consisting essentially of zinc sulfide which is activated by about 0.12 to 0.2 per cent of manganese and about 0.0001 to 0.005 per cent of copper.

2. An infrared-responsive phosphor consisting essentially of zinc sulphide and activated by about 0.12 to 0.2 per cent of manganese activator and about 0.0001 per cent of copper activator.

3. A photoluminescent phosphor consisting essentially of zinc sulphide which is activated by about .005% of copper and 0.12 to 0.20 per cent of manganese, said phosphor emitting orange-colored light when energized by ultraviolet light.

4. A cathode ray screen comprising a transparent base, a layer of a photoluminescent phosphor consisting essentially of zinc sulfide thereon activated by about 0.12 to 0.2 per cent of manganese and about 0.0001 to 0.005% of copper, and a second layer superimposed upon said first layer comprising a phosphor adapted to emit in response to electron impact photoluminescent radiation capable of exciting phosphorescence in said first layer.

5. A screen as in claim 4 in which said second layer comprises a phosphor adapted to emit photoluminescent radiation near the short wave end of the visible spectrum.

6. A screen as in claim 4 in which said second layer comprises silver activated zinc sulfide.

GORTON R. FONDA.

REFERENCES CITED

The following references are of record in the file of this patent:

UNITED STATES PATENTS

| Number | Name | Date |
| --- | --- | --- |
| 2,056,545 | Varian | Oct. 6, 1936 |
| 2,075,399 | Levy et al. | Mar. 30, 1937 |
| 2,435,436 | Fonda | Feb. 3, 1948 |
| 2,446,764 | Henderson | Aug. 10, 1948 |
| 2,447,851 | Fonda | Aug. 24, 1948 |
| 2,452,522 | Leverenz | Oct. 26, 1948 |

OTHER REFERENCES

Chem. Abstracts, 1946, vol. 40, 4297, "Mechanism of Phosphorescence."

Abstract of Article by V. V. Antonov-Romanovskii, in Bull. Acad. Sci., U. R. S. S. Ser. phys., 9, 364–88 (1945).

Handbuck der Experimental Physik, vol. XXIII, I Teil, pages 386–395.